Patented July 27, 1937

2,087,999

UNITED STATES PATENT OFFICE 2,087,999

POLYVALENT METAL SALTS OF ACID HIGH MOLECULAR WEIGHT ESTERS OF POLY-CARBOXYLIC ACIDS

Paul L. Salzberg, Wilmington, Del., assignor to E. I. du Pont de Nemours & Company, Wilmington, Del., a corporation of Delaware No Drawing. Application May 17, 1934, Serial No. 726,108. In Canada June 4, 1931

9 Claims. (Cl. 260—11)

This invention relates to new compounds, more particularly to polyvalent metal salts of acid esters of polycarboxylic organic acids with aliphatic or alicyclic alcohols of high molecular weight.

Specifically, the invention relates to polyvalent metal salts of acid esters of polycarboxylic acids in which the radical of the ester group contains at least ten carbon atoms.

This case is a continuation-in-part of application Serial No. 462,399 filed June 19, 1930 which has issued as U. S. Patent No. 1,965,608.

United States Patent No. 1,742,506 issued January 7, 1930 to Henning, Burke and Reid and its divisional Patents 1,742,507 and 1,742,509 disclose polyvalent metal salts of certain alkyl esters of phthalic acid. Similarly, U. S. Patent No. 1,591,652 issued to Brown et al. and U. S. Patent No. 1,939,676 issued to Ensminger disclose polyvalent metal salts of certain esters of polycarboxylic acids.

This invention has as an object the preparation of polyvalent metal salts of acid esters of aliphatic and/or alicyclic alcohols with polycarboxylic organic acids. A still further object of this invention is the preparation of polyvalent metal salts of acid esters of an aliphatic and/or alicyclic alcohol with a polycarboxylic aliphatic, aromatic, and/or cycloaliphatic acid. A still further object is the preparation of polyvalent metal salts soluble in aliphatic hydrocarbons. A still further object is the provision of processes whereby these salts may be prepared. Other objects will appear hereinafter.

These objects are accomplished by the following invention wherein a polyvalent metal salt of an acid ester of a polycarboxylic acid wherein at least one hydrogen atom of a carboxyl group of the polycarboxylic acid is replaced by an aliphatic radical of at least ten carbon atoms is prepared by reacting an alkali metal salt of the acid ester with a solution of a salt of the polyvalent metal or by analogous or equivalent processes.

In general, in the processes of the present invention a solution of a sodium or other alkali metal salt of the acid ester of the polycarboxylic acid is dissolved in a suitable solvent mixture, for example, 80 parts of ethyl alcohol and 20 parts of water and the solution thus obtained is intimately mixed with a water solution of a soluble salt of the polyvalent metal. The polyvalent metal salt of the acid ester precipitates and can be separated from the supernatant liquid by filtration. If desired, the compound so prepared can be further purified by dissolving, for example in an aromatic hydrocarbon, removing the small amount of dissolved water by means of a dehydrating agent, such as anhydrous sodium sulfate, and filtering off the insoluble residue. The polyvalent metal salt of the polycarboxylic acid ester may, if desired, be used in solution or may be isolated, for example, by evaporation of the solvent.

Having outlined the general principle of the invention above, the following applications thereto to certain specific instances are included for purpose of illustration and not in limitation.

Example 1.—Zinc dodecyl phthalate

One hundred sixty-seven parts by weight of mono-dodecyl phthalate was dissolved in 400 parts by weight of ethyl alcohol and intimately mixed with 20 parts by weight of sodium hydroxide dissolved in 100 parts by weight of water. The clear solution was then agitated with 34 parts by weight of zinc chloride dissolved in 50 parts by weight of water, and a viscous, sticky liquid precipitated. The supernatant liquid was decanted and the viscous product dissolved in toluene. The toluene solution was dried with anhydrous sodium sulfate and the insoluble residue was filtered off. The soft, light colored zinc dodecyl phthalate was isolated by evaporating the toluene.

Example 2.—Ferric dodecyl phthalate

One hundred sixty-seven parts by weight of mono-dodecyl phthalate was dissolved in 400 parts by weight of ethyl alcohol and intimately mixed with 20 parts by weight of sodium hydroxide in 100 parts by weight of water. To this solution was added 45 parts by weight of the hexahydrate of ferric chloride dissolved in 50 parts by weight of water. A reddish oil separated and the supernatant liquid was decanted. The oil was dissolved in 200 parts by weight of toluene, the solution dried with sodium sulfate, and the insoluble residue filtered off. The soft, reddish colored ferric dodecyl phthalate was isolated by evaporating the toluene under reduced pressure.

Example 3.—Zinc-octyl-decyl-dodecyl phthalate

Three hundred eight parts by weight of a mixture of octyl alcohol, decyl alcohol and dodecyl alcohol having a molecular weight of 154 was heated with 296 parts by weight of phthalic anhydride for 1.5 hours at 120° C. One hundred fifty-one parts by weight of the resulting alkyl phthalate was dissolved in 400 parts by weight of alcohol and neutralized with a 20% solution of sodium hydroxide in water. The resulting clear solution was then intimately mixed with 34 parts by weight of zinc chloride dissolved in 50 parts by weight of water to give a clear solution, which when poured into two liters of water, precipitated a white, sticky oil. The oil was dissolved in about 150 parts by weight of toluene, the toluene solution dried with anhydrous sodium sulfate, and the insoluble material filtered off. The soft, sticky zinc alkyl phthalate was isolated by evaporating the solvent in a vacuum oven.

*Example 4.—Ferric undecylenic phthalate*

Thirty-four parts by weight of undecylenic alcohol ($CH_2=CH(CH_2)_8CH_2OH$) and 29.6 parts by weight of phthalic anhydride were heated one-half hour at 140° C. The product was dissolved in 50 parts by weight of ethyl alcohol and neutralized with a solution of 8 parts by weight of sodium hydroxide in 50 parts by weight of water. Twenty parts of weight of the hexahydrate of ferric chloride dissolved in 50 grams of water was stirred into the above solution and a soft, syrupy, dark red oil precipitated. The product was soluble in acetone, ethyl alcohol, butyl alcohol, butyl acetate, toluene, and gasoline.

*Example 5.—Ferric cetyl phthalate*

24.2 parts by weight of cetyl alcohol and 14.8 parts by weight of phthalic anhydride were heated one-half hour at 140° C. The resulting monocetyl phthalate was dissolved in 100 parts by weight of ethyl alcohol and intimately mixed with a solution of 4 parts by weight of sodium hydroxide in 50 parts by weight of water. Into the resulting clear solution was stirred a solution of 9 parts by weight of the hexahydrate of ferric chloride in 10 parts by weight of water. A red resin precipitated which was soluble in toluene, butyl alcohol, and gasoline but was insoluble in ethyl alcohol.

*Example 6.—Ferric dodecyl maleate*

Monododecyl maleate (28 parts by weight) was dissolved in ethyl alcohol (80 parts by weight), neutralized with the required amount of sodium hydroxide (20% solution in water) and the resulting clear solution intimately mixed with a solution of 9 parts by weight of the hexahydrate of ferric chloride dissolved in 10 parts by weight of water. A reddish colored, waxy solid separated and the supernatant liquid was decanted. The ferric dodecyl maleate was soluble in toluene, butyl alcohol, and gasoline.

*Example 7.—Ceric beta-decahydro naphthyl phthalate*

A mixture of 30.8 parts by weight of decahydro beta-naphthol and 29.6 parts by weight of phthalic anhydride was heated one-half hour at 140° C. The product was dissolved in 100 parts by weight of ethyl alcohol and exactly neutralized with a 20% solution of potassium hydroxide in water. A solution of a soluble ceric salt was prepared by mixing 13 parts by weight of ceric oxide with 10 parts by weight of sulfuric acid dissolved in 100 parts by weight of cold water and filtering off the insoluble portion. This aqueous solution was added to the above alcohol solution and a light brown, soft resin precipitated. The supernatant liquid was decanted and the resin was dissolved in toluene.

Any salt-forming polyvalent metal may be used in the practice of the present invention, thus, iron, copper, cobalt, nickel, manganese, tin, zinc, lead, cadmium, mercury, gold, platinum, magnesium, barium, calcium, strontium, aluminum, neodymium, titanium, zirconium, cerium, thorium, vanadium, bismuth, chromium, uranium, etc. The salts of the various metals partake of the color which is characteristic of the metal, modified in some instances by the color of the acid ester, thus, the copper salt of dodecyl phthalate is blue-green, the aluminum and ceric salts are light yellow, the cobalt salt violet, and the iron salt red. In the examples, the exact proportions necessary to produce the mono-alkyl phthalate is specified. These stoichiometrical proportions need not, however, be adhered to and any quantity of phthalic anhydride up to and including the proportions necessary to react with all of the hydroxyl groups may be employed. While primary fatty alcohols such as are obtained by the carboxyl hydrogenation of vegetable oils, for example, coconut oil or cottonseed oil as disclosed in copending application of W. A. Lazier, Serial No. 445,224, filed April 17, 1930 or in U. S. Patent 1,839,974 to Lazier are preferred, it is to be understood that other alcohols may be used, for example, the alcohols obtained by the hydrogenation of animal oils such as sperm oil, the alcohols obtained by hydrating olefines produced by the cracking of paraffin wax or the higher alcohols produced in the catalytic hydrogenation of carbon monoxide. These latter include a large number of high molecular weight branched chain alcohols, some of which are of use in the processes of the present invention. The lead salts of the phthalic acid esters of these high molecular weight branched chain alcohols may thus be prepared and may be of use as driers.

In general any alcohol of at least ten carbon atoms may be used including, in addition to those already mentioned, 9,10-octadecenyl, 12-hydroxy-9,10-octadecenyl, eleostearyl, abietyl, and octadecyl alcohols obtainable by the processes of the Lazier patent above disclosed, tetradecyl, myricyl, melissyl, tetradecahydroanthracenyl, and naphthenyl alcohols, particularly naphthenyl alcohols of ten to thirteen carbon atoms.

While the examples for the most part disclose the use of individual alcohols, mixtures of various alcohols may be employed and are particularly useful in lowering the softening point of the polyvalent metal salts.

In preparing the acid ester of the polycarboxylic acid, it is particularly desirable because of convenience of operation, etc., to use the anhydride of the polycarboxylic acid where this is possible. This allows a more ready formation of acid esters and minimizes the formation of neutral esters. The term "polycarboxylic acid" in the claims is therefore to be understood as including the anhydrides thereof. It is, however, possible to make the compounds by processes in which the acid is itself used. Similarly, the acid esters may be made by the use of the acid chloride with an excess of the particular alcohol or may even be made from the neutral ester and alcohol and an ester interchange catalyst.

The phthalic anhydride of the examples may be replaced by other carboxylic acids or anhydrides such as succinic, malic, maleic, fumaric, adipic, citric, camphoric, hexahydrophthalic, trimesic and quinolinic. The preferred acid is as indicated by the examples phthalic acid or rather its anhydride. While in general the reaction is carried out by heating the alcohol and the anhydride for a period of at least 30 minutes, a wide range of temperature may be used but a temperature range of 120-150° C. is preferred. This treatment is sufficient to cause the anhydride to react with the hydroxyl group of the alcohol in a relatively short time. The course of the esterification may readily be followed by titration of samples with standard alkali. Thus, in preparing monododecyl phthalate, the theoretical acid number is obtained after heating at 140° C. for one-half hour or at 120° C. for one hour. The phthalic acid ester is then neutralized in aqueous-alcohol solution with sodium or potassium hydroxide or carbonate to obtain the solution of the neutral alkali metal salt which in turn is treated with a water soluble salt of the polyvalent metal to obtain by double decomposition the metal salt desired.

The compounds of the present invention are valuable constituents of nitrocellulose lacquers and are also useful as driers for accelerating the oxidation of drying oils. The compounds of the type herein disclosed are soluble in many organic solvents, for example, ethyl acetate, butyl acetate, butyl alcohol, and toluene. They offer therefore an advantageous method of incorporating metals with organic materials where they may function, for example, as drying agents in paints and varnishes. These metal salts are compatible with nitrocellulose and are therefore particularly useful when it is desired to intimately incorporate a metal containing compound with nitrocellulose. Thus, the use of these metals provides excellent means for incorporating metals such as iron, copper, cobalt, vanadium, cerium, and titanium which are capable of absorbing ultraviolet light and therefore capable of retarding the destructive action of sunlight on lacquer films.

Outdoor durability tests carried out on lacquer films comprising nitrocellulose and metal alkyl phthalates have demonstrated that compounds of ten or more carbon atoms impart greater durability than the lower alkyl phthalates, for example, the metal butyl phthalates. Although the protective action of metal salts has been assumed to be due to the ultraviolet absorption characteristics of the metallic element and although ferric cetyl phthalate contains much less iron than the butyl phthalate, the cetyl compound nevertheless gives a nitrocellulose film of greater outdoor durability. The long chain metal phthalates of the present invention exemplified by the metal dodecyl phthalates show a further advantage over the lower alkyl phthalates such as the metal butyl phthalates in that the long chain metal phthalates are more soluble in aliphatic hydrocarbons. This is particularly true for salts such as the iron and lead alkyl phthalates which are capable of accelerating the hardening of drying oils.

The above description and examples are intended to be illustrative only. Any modification of or variation therefrom which conforms to the spirit of the invention is intended to be included within the scope of the claims.

I claim:

1. A polyvalent metal salt of the acid phthalic ester of the mixture of monohydric, aliphatic, open chain, primary, alcohols obtainable by the carboxyl hydrogenation of coconut oil and containing in substantial amounts octyl, decyl and dodecyl alcohols.

2. Ferric cetyl phthalate.

3. Zinc dodecyl phthalate.

4. A polyvalent heavy metal salt of an acid ester of a polycarboxylic acid in which ester at least one hydrogen atom of a carboxyl group has been replaced by an open chain aliphatic hydrocarbon radical of at least ten carbon atoms.

5. A polyvalent heavy metal salt of an acid phthalate wherein the hydrogen atom of one carboxyl group has been replaced by an open chain aliphatic hydrocarbon radical of at least ten carbon atoms.

6. A polyvalent heavy metal salt of the acid phthalic ester of the mixture of monohydric, open chain aliphatic, alcohols obtainable by the carboxyl hydrogenation of coconut oil and containing in substantial amounts octyl, decyl and dodecyl alcohols.

7. The salt of claim 6 wherein the polyvalent heavy metal is zinc.

8. A polyvalent heavy metal salt of mono cetyl phthalate.

9. A polyvalent heavy metal salt of monododecyl phthalate.

PAUL L. SALZBERG.